Feb. 13, 1940. H. H. McKEE 2,190,432
SAUSAGE TREATING APPARATUS
Original Filed March 26, 1936
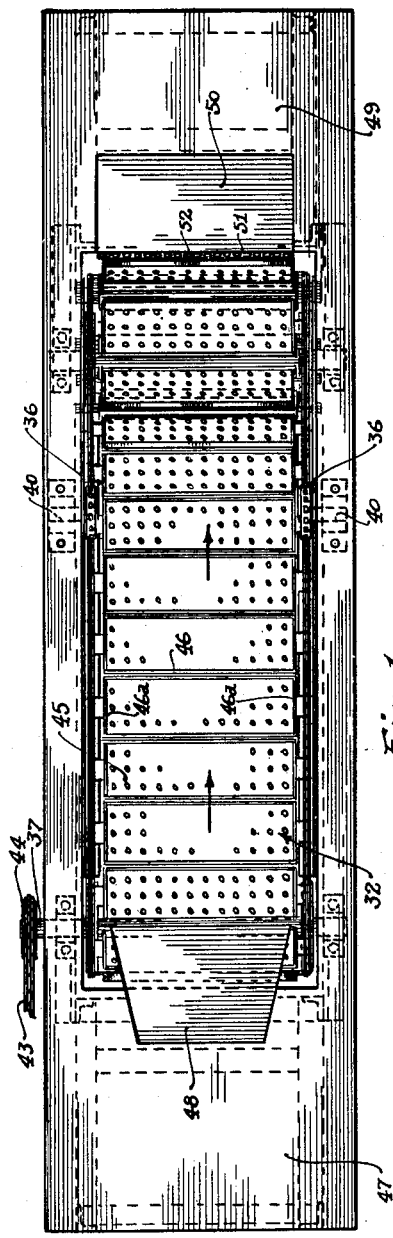
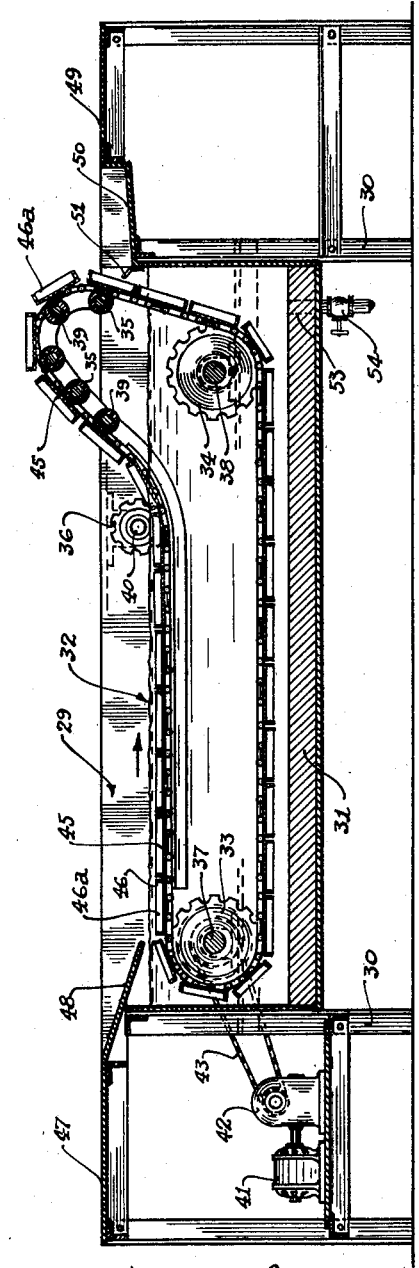
Harry H. McKee, Inventor
By George W. Johns
Attorney Patented Feb. 13, 1940

2,190,432

UNITED STATES PATENT OFFICE 2,190,432

SAUSAGE TREATING APPARATUS

Harry H. McKee, Chicago, Ill., assignor to Industrial Patents Corporation, Chicago, Ill., a corporation of Delaware Original application March 26, 1936, Serial No. 70,977. Divided and this application April 10, 1937, Serial No. 136,194

2 Claims. (Cl. 53—7)

This invention relates to a device for treating casingless sausage.

This application is a division of my application Serial No. 70,977, filed March 26, 1936 and entitled Apparatus for preparing sausage.

One of the objects of this invention is to provide a sausage machine for treating skinless sausage.

Another object of this invention is to provide a device for immersing lengths of casingless sausage in a liquid bath to provide a crust-like surface thereon.

Other objects of this invention will be apparent from the description and claims which follow.

The apparatus of the present invention may be employed for carrying out the method of my copending application entitled Sausage preparation, Serial No. 18,255, filed April 25, 1935.

I refer now to the drawing in which similar reference characters are used to designate similar elements.

Figure 1 is a plan view of the apparatus employed for immersing the lengths of casingless sausage in a liquid bath.

Figure 2 is a side elevational view, partly in section, of Figure 1.

This invention relates to an apparatus for treating skinless sausage for market by heating the formed sausage at a sufficiently high temperature to form a surface crust thereon, but for such a short period of time as to prevent cooking the sausage. One method of preparing skinless sausage was disclosed in my co-pending application, Serial No. 70,977, filed March 26, 1936, of which this application is a division.

The method was, briefly, one in which finely comminuted meat, properly seasoned, is forced under considerable pressure from nozzles upon a moving tray, the loaded tray being removed to a chilling room and quickly chilled to a low temperature to slightly freeze the surface of the sausage in order to facilitate later handling, cutting the slightly frozen sausage into convenient lengths by any suitable means and immersing the cut lengths of sausage material in a liquid bath at a sufficiently high temperature to form a surface crust thereon. A preferable embodiment of such a treating apparatus is shown in Figures 1 and 2, which broadly comprise a tank 29 mounted upon uprights or standards 30, the said tank being provided with a jacketed heating element 31 and an endless conveying means 32 mounted therein.

Conveyor 32 is of the endless chain type and is mounted upon sprocket wheels 33 and 34 and guide rollers 35 and 36, the sprocket wheels 33 and 34 and guide rollers 35 and 36 being respectively mounted upon shafts 37, 38, 39 and 40, journaled within suitable bearings mounted on the inner side walls of tank 29. Conveyor 32 is driven by power transmitted from motor 41 through gear box 42, sprocket chain 43 and sprocket wheel 44 pinioned to shaft 37.

Through use of suitable gearing in gear box 42, the travel of conveyor 32 may be regulated to control the period of submersion of the sausage lengths carried thereon. In practice, a period of approximately 15 seconds in a hot oil carried at a temperature of about 220° F. has been found most satisfactory.

Pans 45, of galvanized metal or other suitable material, are provided with upwardly extending sides 46 and ends 46a to urge material carried thereon in a forward direction and prevent loss of product at the discharge end. Pans 45 are perforated as shown in Figure 5 to permit oil to drain. The ends 46a may be of greater height than the sides 46.

Guide rollers 35 are arranged in arcuate formation above sprocket wheel 34 and in a manner to carry the conveyor surface slightly beyond sprocket wheel 34 such that the conveyor in its downward flight between guide rollers 35 and sprocket wheel 34 will extend slightly inwardly and serve to discharge by gravity the material as carried beyond the guide rollers 35.

Guide roller 36 is arranged to ride upon the upper surface of conveyor 32 for the purpose of holding the conveyor surface at a constant level between sprocket wheel 33 and guide rollers 35.

In practice, tank 29 is filled with a liquid slightly above the level of pans 45 as they travel between sprocket wheel 33 and guide roller 36 such that the lengths of material loaded upon conveyor 32 will be carried below the liquid level during the interim of travel of conveyor 32 between sprocket wheel 33 and guide roller 36.

The liquid contained within tank 29 preferably consists of a hot oil maintained at a frying temperature of approximately 220° F. by means of a heat exchange element which may be thermostatically controlled for the purpose of forming a crust on the outer surfaces of the individual sausage lengths and also to impart a characteristic deep frying flavor thereto. The oil contained within tank 29 may be maintained at a predetermined level by means of a supply reservoir controlled by a float valve within the tank 29, by manually replenishing the supply within the tank 29 from time to time, or in any other suitable manner.

Tank 29 adjacent the receiving end of conveyor 32 is provided with a suitable table surface 47 having inclined slide 48 directed toward the receiving end of conveyor 32 to aid an operator positioned at table 49 in loading the sausage lengths on conveyor 32.

Adjacent the discharge end of conveyor 32, tank 29 is provided with packing table 49. Table 49 is provided with an inclined trough portion 50 positioned between guide rollers 35 and sprocket wheel 34 for receiving the sausage lengths discharged from conveyor 32. Flange member 51 is secured along the lower edge of the trough 50 to guard against discharged sausages rolling into the tank 29. Flange 51 is perforated at 52 to permit drainage of excess oil from trough 50.

Drain 53 controlled by valve 54 extends from the side of tank 29 to provide means for completely draining the oil from time to time.

It will be understood that the present invention is applicable for treating casingless pork sausage, frankfurter type sausage, Vienna type sausage and similar sausage products whether sold in the can or in bulk.

I claim:

1. A device of the class described comprising a tank adapted to carry a cooking liquid at a predetermined level and provided with heating means for maintaining the liquid at a predetermined temperature, an endless conveyor mounted within the tank providing a conveying surface beneath the level of the liquid, the conveying surface comprising a plurality of foraminous product carrying trays, and means for raising the conveying surface of the conveyor to a plane above the level of the liquid and for returning the conveying surface in a vertically inclined plane to discharge by gravity and at a point above the level of the liquid the product carried in the product carrying trays.

2. A device of the class described comprising a tank adapted to carry a cooking liquid at a predetermined level and provided with means for maintaining the liquid at a predetermined temperature, an endless conveyor mounted upon sprocket wheels disposed at opposite ends of the tank and in a manner providing a conveying surface beneath the level of the liquid, the conveying surface comprising a plurality of foraminous product carrying trays, means including a series of arcuately arranged guide rollers mounted above and in a manner to extend slightly beyond the sprocket wheel disposed at the discharge end of the conveyor to raise the conveying surface of the conveyor to a plane above the level of the liquid and to return the conveying surface of the conveyor in a vertically inwardly inclined plane to discharge by gravity and at a point above the level of the liquid the product carried by the product carrying trays and means for receiving the discharged product.

HARRY H. McKEE.